(12) United States Patent
Tamai et al.

(10) Patent No.: US 9,863,472 B2
(45) Date of Patent: Jan. 9, 2018

(54) LUBRICATION SYSTEM AND METHOD FOR A BALL BEARING

(71) Applicant: GM Global Technology Operations LLC, Detroit, MI (US)

(72) Inventors: Goro Tamai, Bloomfield Hills, MI (US); Shawn H. Swales, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/181,054

(22) Filed: Jun. 13, 2016

(65) Prior Publication Data
US 2017/0356498 A1    Dec. 14, 2017

(51) Int. Cl.
*F16C 33/66* (2006.01)

(52) U.S. Cl.
CPC ...... *F16C 33/6651* (2013.01); *F16C 33/6659* (2013.01); *F16C 33/6681* (2013.01)

(58) Field of Classification Search
CPC ............... F16C 33/664; F16C 33/6651; F16C 33/6659; F16C 33/6666; F16C 33/6681; F16C 33/6685
See application file for complete search history.

(56) References Cited

U.S. PATENT DOCUMENTS

| | | | | |
|---|---|---|---|---|
| 1,724,902 A | * | 8/1929 | Bentley | F16C 33/6659 277/429 |
| 2,240,118 A | * | 4/1941 | Matthews | F16C 33/6659 184/11.1 |
| 3,751,699 A | * | 8/1973 | Gleichman | F16C 33/6651 184/6 |
| 6,474,444 B1 | * | 11/2002 | Mochizuki | F16C 33/6651 184/6.12 |
| 8,931,596 B2 | | 1/2015 | Shioiri et al. | |
| 9,103,432 B2 | | 8/2015 | Isomura et al. | |

* cited by examiner

*Primary Examiner* — James Pilkington

(57) ABSTRACT

A gravity fed bearing lubrication system for distributing lubricant to powertrain components in a motor vehicle, including a lubricant supply, a bearing, and a bearing housing. A three-dimensional cast-in portion of the bearing housing controls the communication of lubricant to the bearing.

20 Claims, 3 Drawing Sheets

LUBRICATION SYSTEM AND METHOD FOR A BALL BEARING

FIELD

The present invention relates to systems and methods for supporting a bearing in a housing and providing a mechanism to ensure the bearing is lubricated.

BACKGROUND

The statements in this section merely provide background information related to the present disclosure and may or may not constitute prior art.

A typical gravity-feed bearing lubrication system for lubricating a bearing in an automobile includes a bearing housing, lubrication ports and a lubricant. The bearing is, typically, pressed into the bearing housing, and a supply of lubricant is provided to the bearing by a lubricant supply port or aperture formed in the bearing housing. The lubricant is carried from the lubricant supply aperture into the bearing housing, through the bearing, and to a lubricant departure aperture by gravity.

The bearing is commonly constructed with an inner bearing race, an outer bearing race, a bearing cage disposed between the inner race and outer race, and a plurality of bearing members that are also disposed between the inner race, the outer race, and the bearing cage. The inner bearing race rotationally supports a shaft or rotating component with which the bearing is axially aligned. The outer bearing race is typically anchored to the bearing housing such that the inner race and outer race may move relative to one another, but remain fixed to the shaft or rotating component and the bearing housing respectively.

Under normal operating conditions, a typical gravity-feed bearing lubrication system may only require nominal lubricant flow to the bearing and bearing housing for both lubrication and heat transfer purposes. However, under severe conditions, such as under extreme acceleration, or on a steep grade driving, the bearing and bearing housing require consistent lubricant flow to maintain proper friction and temperature characteristics. If an excessive supply of lubricant is directed to the bearing, that lubricant can become entrained in the bearing and lead to frictional losses and operational inefficiency. If a paucity of lubricant is provided to the bearing, the lack of lubricant also leads to undesirable frictional losses and wear on the bearing.

While conventional gravity-feed bearing lubrication systems are effective, there is room for improved lubrication supply systems that ensure the proper amount of lubricant is supplied to the bearing under extreme operating conditions. Especially desirable, would be a lubrication system that performs under extreme operating conditions and does not cause a loss in operating efficiency.

SUMMARY

In an embodiment of the present invention, a system for lubricating a bearing is provided. The bearing includes an inner race, an outer race and a plurality of bearing members disposed there between. The bearing is disposed in a housing. The system has a bearing pocket formed in the housing for supporting the bearing. The bearing pocket is annular and has an open end and a partially closed end and a cylindrical portion disposed between the open end and the partially closed end. The cylindrical portion has a first end, a second end, and a surface and the bearing pocket is configured to receive the bearing. The partially closed end is partially closed by an annular flange extending radially inwardly from the cylindrical portion of the bearing pocket and the second end of the cylindrical portion has an outwardly extending radial wall formed therein. There is a raised flange positioned along a portion of the annular flange. The raised flange extends radially inwardly from the annular flange. There is also a weir formed in the cylindrical portion of the bearing pocket and extending axially from within the annular flange and through the radial wall to the open end, and, the outer race of the bearing is positioned adjacent the radial wall and inside the bearing pocket. A lubricating fluid is trapped by the raised flange in the bearing pocket and through the bearing until the fluid rises to a level of the weir.

In another embodiment of the present invention, the weir is positioned at a first end of the raised flange.

In yet another embodiment of the present invention, the weir is a u-shaped trough for capturing lubrication fluid and carrying the fluid from a first side of the bearing underneath the bearing to a second side of the bearing.

In still another embodiment of the present invention, a lubrication port for providing lubricating fluid to the bearing is positioned at a second end of the raised flange.

In a further embodiment of the present invention, the raised flange portion has a height that allows the lubricant to rise to a level where a bottom bearing member is at least half-way submerged in the lubricant.

In yet a further embodiment of the present invention, the raised flange portion has a ridge that extends from the annular flange to the radial wall.

In still a further embodiment of the present invention, the ridge of the raised flange portion decreases in height relative to the cylindrical portion from the annular flange to the radial wall.

In another embodiment of the present invention, the raised flange portion decreases in height relative to the cylindrical portion from the ridge to the weir.

In yet another embodiment of the present invention, the raised flange portion decreases in height relative to the cylindrical portion from the ridge to the lubrication port.

In still another embodiment of the present invention, the raised flange portion is configured to form a cup shape to capture lubrication fluid between the raised flange portion and the bearing to restrict fluid flow to the weir.

In a further embodiment of the present invention, a system for lubricating a bearing having an inner race and an outer race and a plurality of bearing balls disposed there between is provided. The bearing is disposed in a housing. A bearing pocket is formed in the housing for supporting the bearing. The bearing pocket is annular and has an open end and partially closed end and a cylindrical portion disposed between the open end and the partially closed end. The cylindrical portion has a first end and a second end and a surface there between and the bearing pocket is configured to receive the bearing. The partially closed end is partially closed by an annular flange extending radially inwardly from the surface of the cylindrical portion of the bearing pocket and the second end of the cylindrical portion has an outwardly extending radial wall formed therein. There is a diverter positioned along a portion of the annular flange. The diverter extends radially inwardly from the annular flange, and the diverter extends axially from the partially closed end. There is a weir formed in the surface of the cylindrical portion of the bearing pocket and extending axially from within the annular flange and through the radial wall to the open end. There is also a lubrication port formed in the housing. The weir is positioned at a first end of the diverter, and the lubrication port is positioned at a second end of the diverter. The outer race of the ball bearing is positioned adjacent the radial wall and inside the bearing pocket and a lubricating fluid is trapped by the diverter in the bearing pocket and through the bearing until the fluid rises to a level of the weir.

In yet a further embodiment of the present invention, the weir is a u-shaped trough for capturing lubrication fluid and carrying the fluid from a first side of the bearing underneath the bearing to a second side of the bearing.

In still a further embodiment of the present invention, the diverter has a height that allows the lubricant to rise to a level where a bottom bearing ball is at least half-way submerged in the lubricant.

In another embodiment of the present invention, the diverter has a ridge that extends from the annular flange to the radial wall.

In still another embodiment of the present invention, the ridge of the diverter decreases in height relative to the surface of the cylindrical portion from the annular flange to the radial wall.

In yet another embodiment of the present invention, the diverter decreases in height relative to the surface of the cylindrical portion from the ridge to the weir.

In a further embodiment of the present invention, the diverter decreases in height relative to the surface of the cylindrical portion from the ridge to the lubrication port.

In still a further embodiment of the present invention, the diverter is configured to form a cup shape to capture lubrication fluid between the raised flange portion and the ball bearing to restrict fluid flow to the weir.

In yet a further embodiment of the present invention, the diverter extends at least partially into the weir.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses. Accordingly, a lubrication system and method for a ball bearing is disclosed as an example of one embodiment of the present invention, however, the present invention contemplates that the bearing member may be a ball bearing, a roller bearing, a needle bearing, or any other type of rolling element bearing without departing from the scope or intent of the present disclosure.

Figure 1A:
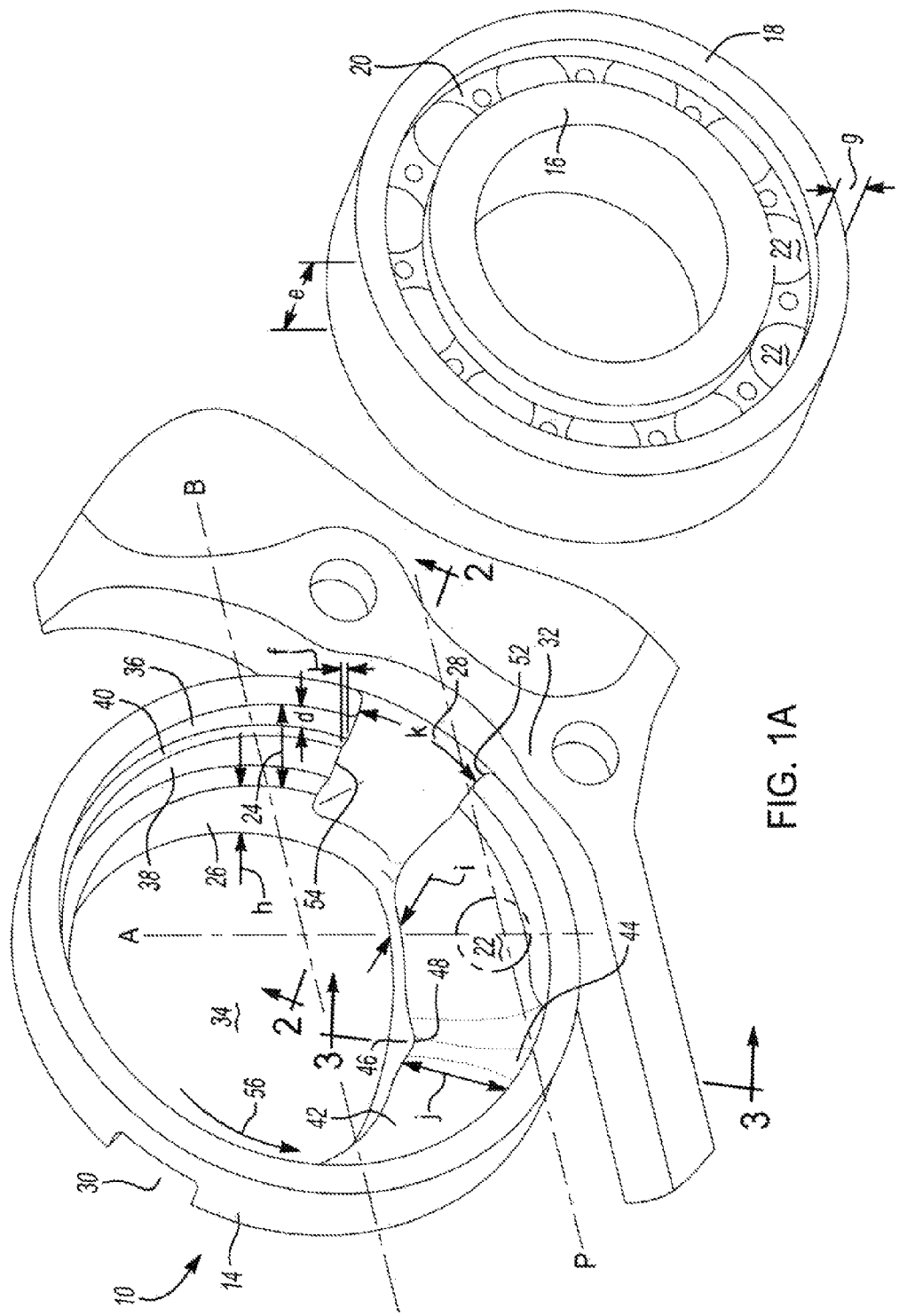
FIG. 1a is an exploded perspective view of a bearing and a bearing lubrication system a vehicle is operating under normal conditions, according to the principles of the present invention.

Referring to FIG. 1a, an exploded perspective view of a system 10 for lubricating a gravity-fed ball bearing 12 is illustrated. To aid in understanding this disclosure, reference lines A, B, and P are provided in FIG. 1a, and reference lines A and B are provided in FIG. 1b. In FIG. 1a, stationary reference line A is a clock-position reference line from 12 o'clock to 6 o'clock, stationary reference line B is a clock-position reference line from 9 o'clock to 3 o'clock, and reference line P denotes the level to which lubricant may rise in a normal operating state of the system. Stationary reference lines A and B are in a separate and fixed reference frame relative to the system 10. The housing 14 will rotate when the vehicle to which the housing 14 is attached is accelerating or driving on an incline.

The system 10 includes a housing 14 for supporting the ball bearing 12. The ball bearing 12 has an inner race 16 and an outer race 18, a ball bearing cage 20, and a plurality of bearing balls 22. The bearing balls 22 are disposed within the ball bearing cage 20 and between the inner race 16 and the outer race 18. The ball bearing 12 is configured to rotatably support a component, such as a shaft for free rotation in the housing 14. More specifically, the outer race 18 is fixed to the housing 14 while the inner race 16 is free to rotate within the housing. A shaft may be fixed to the inner race 16 and is free to rotate with the inner race 16.

The housing 14 of the system 10 for lubricating the bearing 12 includes a bearing pocket 24, an annular flange 26, a weir 28, and a lubricant port 30. Bearing pocket 24 is configured to support bearing 12 within the housing 14. The bearing pocket 24 is annular and sized to accept the outer bearing race 18. The bearing pocket 24 has an open end 32 and a partially closed end 34 with a bearing seat 36 and a cylindrical portion 38 disposed there between.

The bearing seat 36 has a cylindrical surface that extends axially from the open end 32 to a bearing seat radial wall 40. The bearing seat 36 has an axial depth "d" defined by the axial distance between the open end 32 and bearing seat radial wall 40. The axial depth "d" is approximately equal to an axial width "e" of the outer bearing race 18. The bearing seat radial wall 40 has a radial height "f" approximately equal to a radial height "g" of the outer bearing race 18. The outer bearing race 18 of the ball bearing 12 is adjacent to the bearing seat radial wall 40 and inside the bearing seat 36. The cylindrical portion 38 has a surface 38A disposed radially inward of the bearing seat 36 and extends axially from the bearing seat radial wall 40 at a second end 38B of the cylindrical portion 38 to the partially closed end 34 and the annular flange 26 at a first end 38C of the cylindrical portion 38. The annular flange 26 has a surface disposed radially inward of the cylindrical portion 38 and defines the partially closed end 34 of the bearing pocket 24. The annular flange 26 has an axial depth "h" and defines the partially closed end 34.

The housing 14 also includes a diverter or levy contour 42. The diverter or levy contour 42 is formed or positioned overtop a portion of the annular flange 26, and extends into a portion of the bearing pocket 24. Levy contour 42 has an axial depth "i" and a radial height "j". The levy contour 42 extends axially through the housing 14 from the flange 26 across the bearing pocket 24 to the bearing seat radial wall 40. Levy contour 42 also extends transversely across a portion of the partially closed end 34 from the lubricant port 30 to the weir 28. The levy contour 42 axial depth "i", and a radial height "j" vary along the transverse aspect of the levy contour 42 between the lubricant port 30 and the weir 28. The levy contour 42 has a maximum axial depth 44 that extends substantially from the annular flange 26 to the bearing seat radial wall 40. The levy contour 42 maximum axial depth 44 is located approximately halfway between the weir 28 and lubricant port 30. The levy contour 42 has a maximum radial height 46 that is also located approximately halfway between the weir 28 and the lubricant port 30. Additionally, between the maximum depth 44 and the maximum height 46 of the levy contour 42, there is a ridge 48. The ridge 48 slopes from the partially closed end 34 to the bearing seat radial wall 40. From the ridge 48, the levy contour 42 slopes to the surface of the cylindrical portion of the bearing pocket 24, proximate to the lubricant port 30 on a side of the ridge 48 and proximate to the weir 28 on another side of the ridge. The levy contour 42 obstructs lubricant flow to the weir 28 so that a portion of the lubricant that enters the bearing pocket 24 is directed or diverted to the bearing 12, instead of exiting the housing 14 through the weir 28 and circumventing the bearing 12.

The weir 28 is a u-shaped trough formed in the bearing housing 14. The weir 28 extends axially through a portion of the flange and through the bearing pocket 24 to the bearing pocket open end 32. The weir 28 also has a first axial edge 52, and a second axial edge 54. The first edge 52 and second axial edge 54 are spaced by an arc length "k" in the housing 14.

Under normal operating conditions the weir 28 is located at a clock position of approximately 4 o'clock to 5 o'clock relative to stationary reference lines A and B. The weir first edge 52 defines a circumferential arc limit of the weir 28 closest to 6 o'clock, and is separated from the weir second edge 54 which defines another circumferential arc limit of the weir 28 closest to 3 o'clock. Under normal operating conditions, the weir first edge 52 is located at approximately the 5 o'clock position.

The lubricant port 30 is in communication with a source of lubricant and is configured to supply lubricant to the bearing pocket 24. Under normal operating conditions, the lubricant port 30 provides lubricant to the system 10 at approximately the 10 o'clock position. The lubricant then traverses the bearing pocket 24 to the 6 o'clock position where the lubricant forms a pool indicated by reference line "P" in the bearing pocket 24 against the bearing 12. When the lubricant fluid level rises to the weir first edge 52 at approximately the 5 o'clock position, the lubricant will spill out of the bearing housing 14 through the weir 28. Thus, weir 28 is in fluid communication with the lubricant on both sides of the bearing 12. Under normal operating conditions, the lubricant pool level should be at approximately one half of the height of the bottom bearing ball 22.

Figure 1B:
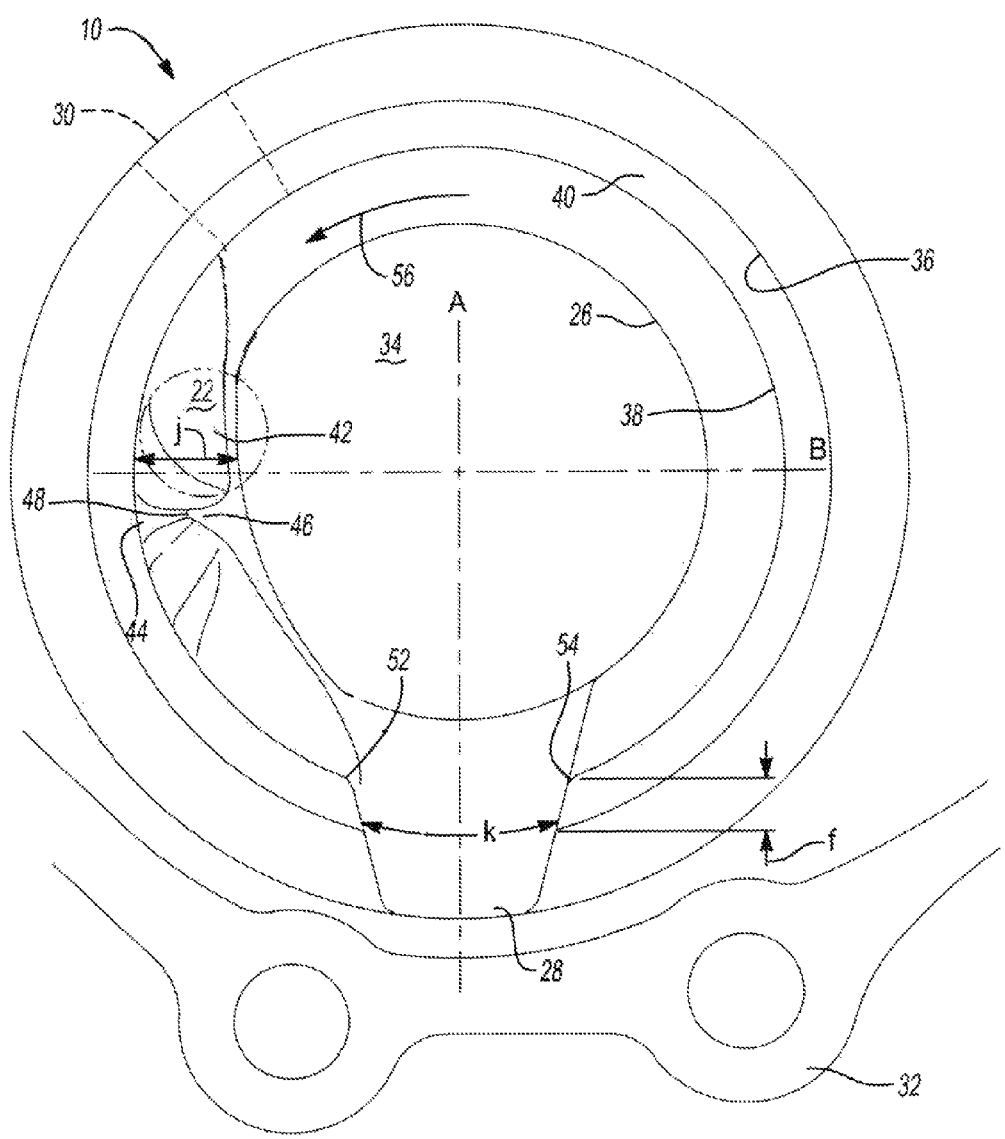
FIG. 1b is a partial plan view of a bearing and a bearing lubrication system when the vehicle is operating in extreme conditions, according to the principles of the present invention.

Turning now to FIG. 1b, the system 10 for lubricating a gravity-fed ball bearing 12 disposed in a housing 14 in an extreme operating condition is illustrated. FIG. 1b includes reference lines A and B from FIG. 1a. In FIG. 1b, the system 10 is rotated relative to the stationary clock reference lines A and B. In FIG. 1b, the weir 28 is located at approximately the 6 o'clock position. Under extreme operating conditions, such as aggressive acceleration or incline-driving, the system 10 may rotate relative to the reference lines A and B, as shown in FIG. 1b. In FIG. 1b, lubricant fluid enters the system 10 via the lubricant port 30 at approximately the 11:30 position, after which lubricant flows to the weir 28 and exits the bearing pocket 24. Levy contour 42 impedes the flow of lubricant to the weir 28 and causes lubricant fluid to flow into the bearing 12 in a quantity that is substantially similar to the amount of lubricant entrained within the bearing 12 during normal operating conditions as shown in FIG. 1a. More specifically, the levy contour 42 causes the lubricating fluid to pool and rise to a level in the bearing pocket 24 before the fluid drains through the ball bearing 12 and the weir 28.

In addition, the orientation of the lubricant port 30 within the system 10 relative to the weir 28 must be carefully determined with consideration given to the dominant rotation direction 56 of each bearing 12. Preferably, for an anti-clockwise-spinning bearing 12 in the system 10 shown in FIG. 1a, the lubricant port 30 is located at approximately the 10:30 position under normal operating conditions. In this configuration, the lubricant port 30 feeds lubricant into the bearing pocket 24 and the bearing 12 so that the force of gravity draws the lubricant down towards the bottom of the bearing pocket 24. Advantageously, a sufficient amount of lubricant becomes entrained in the bearing 12. If, however, the dominant rotation direction 56 of the bearing 12 was reversed, lubricant would be drawn by gravity against the rotation of the clockwise-spinning bearing 12 and an oversupply of lubricant would result. An oversupply of lubricant can cause frictional losses, and premature bearing wear. In FIG. 1b, the weir 28 is at the 6 o'clock position, the levy contour 42 is required to prevent the bearing 12 from being provided with inadequate lubricant supply. Inadequate lubricant supply to the bearing 12 can cause frictional losses, and premature bearing wear. In an extreme operating condition, like that depicted in FIG. 1b, lubricant enters the bearing housing 14 at approximately the 11:30 position, and the levy contour 42 causes lubricant to pool between the lubricant port 30 and the ridge 48 of the contour 42. The lubricant pooling allows adequate lubricant supply to the bearing 12 prior to the lubricant exiting the housing 14.

In FIGS. 1a and 1b, the housing 14 is divided into two radial halves by reference line A. With reference to the two halves of the clock face, the position and three-dimensional shape of the levy contour 42 on the annular flange 26 of the bearing housing 14 is also determined by the position of the lubricant port 30, weir 28, and with deference to the maximum g-force or grade to which the system 10 will likely be exposed. In one aspect, the levy contour 42 is cast into the housing 14, and the three-dimensional shape of the levy contour 42 is machined or otherwise refined. The levy 42 is positioned so that the lubricant port 30 is towards the 12 o'clock position of the clock face, and the levy 42 on the same half of the clock reference below the lubricant port 30. That is, if the lubricant port 30 is positioned on the 9 o'clock half of the housing 14, then the levy 42 is also positioned primarily on the 9 o'clock half of the housing 14 and below the lubricant port. In this configuration, lubricant runs down the levy 42 side of the bearing housing 14.

Additionally, the system 10 is not symmetrical about either of reference line A or B. At rest, with no rotating components, lubricant that enters the housing 14 at or above the position of the levy 42 will pool to the level of reference line "P", the pooling thereby allowing the lubricant to enter the bearing 12, and then flow to the weir 28. Additionally, at rest, lubricant that enters the system 10 below or on the opposite side of the bearing housing 14 from the levy 44 will flow directly into the weir 28.

Figure 2:
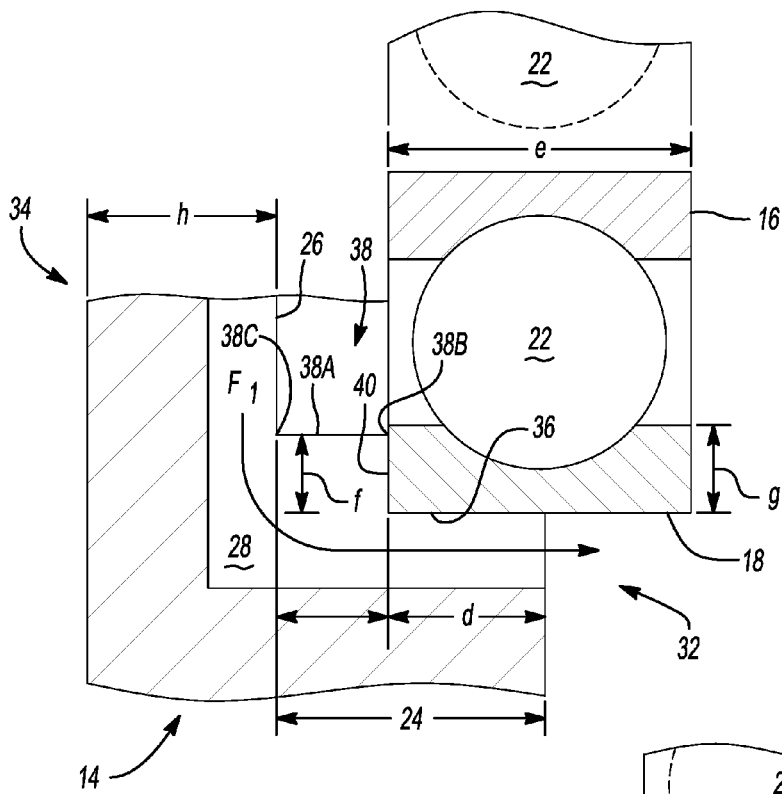
FIG. 2 is a partial cross-sectional view of a portion of the bearing and bearing lubrication system of FIG. 1a, according to the principles of the present invention.

Turning now to FIG. 2, a partial cross sectional view through the housing 14 and bearing 12 is shown. The cross section is taken at the location of the weir 28 from the perspective indicated in FIG. 1a. The weir 28 extends axially from a portion of the flange 26 through part of the flange axial depth "h", through the cylindrical portion 38 and through the bearing seat 36. The bearing 12 rests partially within the bearing seat 36 and the outer race 18 is adjacent to the bearing seat radial wall 40. A portion of the bearing 12 extends beyond the bearing pocket open end 32. Under normal conditions, as shown in FIG. 1a, the weir 28 maintains a lubricant pool level that adequately lubricates the bearing 12. To maintain the lubricant pool level, the weir 28 provides an egress for lubricant in the housing 14. When the lubricant pool level reaches the weir first edge 52, lubricant enters the weir 28 and flows through the weir 28 along weir flow line "f1". As the lubricant flows along flow line "f1", the lubricant circumvents the bearing 12, thereby providing less lubrication to the bearing 12. Under normal circumstances, when the weir 28 is positioned such that the lubricant pool level reaches one half of the bottom bearing ball 22 height, the amount of lubricant entrained in the bearing 12 provides adequate lubrication. Under extreme operating conditions, as shown in FIG. 1b, the weir 28 operates to efficiently allow lubricant to flow out of the housing 14 without interacting with the bearing 12.

Figure 3:
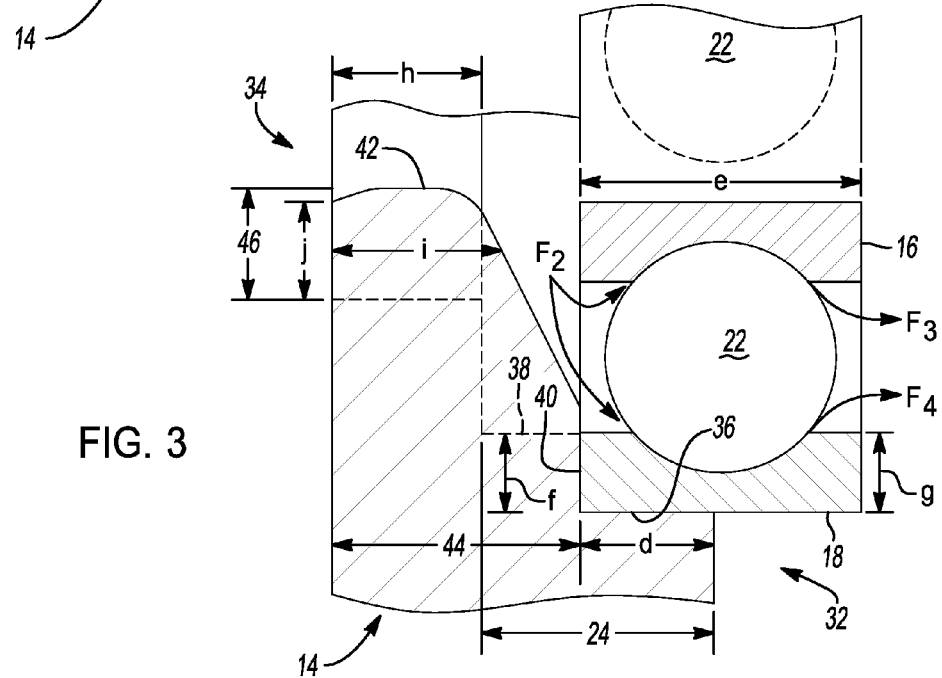
FIG. 3 is a cross-sectional view of a portion of the bearing and bearing lubrication system of FIG. 1a, according to the principles of the present invention.

Turning now to FIG. 3, a partial cross sectional view through the housing 14 and bearing 12 is shown. The cross section is taken at the location of the levy maximum axial depth 44 and levy maximum radial height 46, from the perspective indicated in FIG. 1a. The levy contour 42 extends axially from a portion of the flange 26 across the flange axial depth "h", substantially across the cylinder wall 38. The maximum axial depth 44 is located at the bearing seat radial wall 40 and the levy contour 42 slopes to an axial depth less than the maximum axial depth 44 as the contour 42 extends radially inward to the maximum radial height 46. As in FIG. 2, the bearing 12 rests partially within the bearing seat 36 and the outer race 18 abuts the bearing seat radial wall 40. A portion of the bearing 12 extends beyond bearing pocket open end 32. Under normal conditions, as shown in FIG. 1a, the levy contour 42 has very little impact on lubricant flow into the bearing 12 or into the weir 28. However, when the vehicle is in an extreme operating condition, like the condition of FIG. 1b, the levy contour 42 impedes lubricant flow into the weir. By impeding the flow of lubricant, the levy contour 42 causes a portion of the lubricant flow to pool between the lubricant port 30, the levy contour 42, and the bearing 12. The flow lines "F2", "F3", and "F4" depict the flow direction of the lubricant from a lubricant pool between the levy contour 42 and the bearing 12 to the side of the bearing 12 opposite the levy contour 42. As the lubricant pools between the levy contour 42 and the bearing 12, some of the lubricant enters and becomes entrained in the bearing 12, thereby causing the bearing 12 to be lubricated. Under extreme operating conditions, the levy contour 42 provides lubricant to the bearing 12 rather than allowing the lubricant to travel directly to the weir 28 without first lubricating the bearing 12.

The features and components of the present invention described above, such as the annular flange 26, lubricant port 40, and a levy contour 42 cast or integrally formed in the bearing housing 14 are merely exemplary in nature, and variations that do not depart from the gist of the invention are intended to be within the scope of the invention. Such variations are not to be regarded as a departure from the spirit and scope of the invention.

What is claimed is:

1. A system for lubricating a bearing having an inner race and an outer race and a plurality of bearing members disposed there between, the bearing disposed in a housing, the system comprising:
    a bearing pocket formed in the housing for supporting the bearing, wherein the bearing pocket is annular and has an open end and partially closed end and a cylindrical portion disposed between the open end and the partially closed end wherein the cylindrical portion has a first end and a second end and a surface and wherein the bearing pocket is configured to receive the bearing and, wherein the partially closed end is partially closed by an annular flange extending radially inwardly from the surface of the cylindrical portion of the bearing pocket and wherein the second end of the cylindrical portion has an outwardly extending radial wall formed therein;
    a levy positioned along a portion of the annular flange, wherein the levy extends radially inwardly from the annular flange; and
    a weir formed in the surface of the cylindrical portion of the bearing pocket and extending axially from within the annular flange and through the radial wall to the open end, and,
    wherein the outer race of the bearing is positioned adjacent the radial wall and inside the bearing pocket and whereby a lubricating fluid is impeded by the levy in the bearing pocket and through the bearing until the fluid rises to a level of the weir.

2. The system of claim 1 wherein the weir is positioned at a first end of the levy.

3. The system of claim 2 wherein a lubrication port for providing lubricating fluid to the bearing is positioned at a second end of the levy.

4. The system of claim 3 wherein the levy has a ridge that extends from the annular flange to the radial wall.

5. The system of claim 4 wherein the ridge of the levy decreases in height relative to the surface of the cylindrical portion from the annular flange to the radial wall.

6. The system of claim 4 wherein the levy decreases in height relative to the surface of the cylindrical portion from the ridge to the weir.

7. The system of claim 4 wherein the levy decreases in height relative to the surface of the cylindrical portion from the ridge to the lubrication port.

8. The system of claim 1 wherein the weir is a u-shaped trough for capturing lubrication fluid and carrying the fluid from a first side of the bearing underneath the bearing to a second side of the bearing.

9. The system of claim 1 wherein the levy has a height that allows the lubricant to rise to a level where a bottom bearing ball is at least half-way submerged in the lubricant.

10. The system of claim 1 wherein the bearing members are one of a ball bearing, needle bearing, or a roller bearing.

11. The system of claim 1 wherein the levy is configured to form a cavity to capture lubrication fluid between the levy and the bearing member to restrict fluid flow to the weir.

12. A system for lubricating a bearing having an inner race and an outer race and a plurality of bearing balls disposed there between, the bearing disposed in a housing, the system comprising:
    a bearing pocket formed in the housing for supporting the bearing, wherein the bearing pocket is annular and has an open end and partially closed end and a cylindrical portion disposed between the open end and the partially closed end wherein the cylindrical portion has a first end and a second end and a surface and wherein the bearing pocket is configured to receive the bearing and, wherein the partially closed end is partially closed by an annular flange extending radially inwardly from the surface of the cylindrical portion of the bearing pocket and wherein the second end of the cylindrical portion has an outwardly extending radial wall formed therein;

a diverter positioned along a portion of the annular flange, wherein the diverter extends radially inwardly from the annular flange and wherein the diverter extends axially from the partially closed end; and a weir formed in the surface of the cylindrical portion of the bearing pocket and extending axially from within the annular flange and through the radial wall to the open end; and a lubrication port formed in the housing; and wherein the weir is positioned at a first end of the diverter, and the lubrication port is positioned at a second end of the diverter; and wherein the outer race of the ball bearing is positioned adjacent the radial wall and inside the bearing pocket and whereby a lubricating fluid is impeded by the diverter in the bearing pocket and through the bearing until the fluid rises to a level of the weir.

13. The system of claim 12 wherein the weir is a u-shaped trough for capturing lubrication fluid and carrying the fluid from a first side of the bearing underneath the bearing to a second side of the bearing.

14. The system of claim 12 wherein the diverter has a height that allows the lubricant to rise to a level where a bottom bearing ball is at least half-way submerged in the lubricant.

15. The system of claim 12 wherein the diverter has a ridge that extends from the annular flange to the radial wall.

16. The system of claim 15 wherein the ridge of the diverter decreases in height relative to the surface of the cylindrical portion from the annular flange to the radial wall.

17. The system of claim 15 wherein the diverter decreases in height relative to the surface of the cylindrical portion from the ridge to the weir.

18. The system of claim 15 wherein the diverter decreases in height relative to the surface of the cylindrical portion from the ridge to the lubrication port.

19. The system of claim 12 wherein the diverter is configured to form a cavity to capture lubrication fluid between the raised flange portion and the ball bearing to restrict fluid flow to the weir.

20. The system of claim 12 wherein the diverter extends at least partially into the weir.

* * * * *